United States Patent
Iwasaki et al.

(10) Patent No.: US 7,253,237 B2
(45) Date of Patent: Aug. 7, 2007

(54) ROOM TEMPERATURE CURABLE ORGANOPOLYSILOXANE COMPOSITION

(75) Inventors: Isao Iwasaki, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 18 days.

(21) Appl. No.: 10/965,210

(22) Filed: Oct. 15, 2004

(65) Prior Publication Data
US 2005/0124768 A1 Jun. 9, 2005

(30) Foreign Application Priority Data
Oct. 17, 2003 (JP) .............................. 2003-357535

(51) Int. Cl.
*C08L 83/04* (2006.01)
(52) U.S. Cl. .................... 525/477; 524/186; 524/191; 524/262; 528/34
(58) Field of Classification Search ..................... None
See application file for complete search history.

(56) References Cited

U.S. PATENT DOCUMENTS 3,565,838 A * 2/1971 Atkinson et al. ............. 528/18
4,447,576 A   5/1984 Fukayama et al.
4,748,166 A * 5/1988 Gautier et al. ................ 524/13
4,762,879 A * 8/1988 Letoffe et al. ............... 524/720
6,936,676 B2 * 8/2005 Okuhira et al. ............... 528/25

FOREIGN PATENT DOCUMENTS

| JP | 60-158254 | 8/1985 |
|---|---|---|
| JP | 6-220325 | 8/1994 |
| JP | 6-220328 | 8/1994 |
| JP | 6-220329 | 8/1994 |

* cited by examiner

*Primary Examiner*—Marc S. Zimmer
(74) *Attorney, Agent, or Firm*—Oblon, Spivak, McClelland, Maier & Neustadt, P.C.

(57) ABSTRACT

A room temperature curable organopolysiloxane composition is provided. It includes (A): a diorganopolysiloxane containing 2 hydroxyl groups or hydrolysable groups bonded to silicon atoms within each molecule; (B): (B1) an amine compound of the general formula (2):

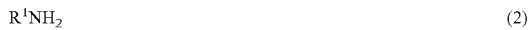

$$R^1NH_2 \qquad (2)$$

(wherein, $R^1$ represents a monovalent hydrocarbon group of 12 to 30 carbon atoms), and/or an amine compound of the general formula (3):

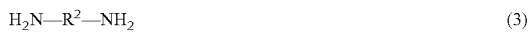

$$H_2N-R^2-NH_2 \qquad (3)$$

(wherein, $R^2$ represents a bivalent hydrocarbon group of 4 to 30 carbon atoms), or (B2) a compound which, via a hydrolysis reaction, is capable of yielding an amine compound of (B1); (C) a cross-linking agent; and (D) a curing catalyst. The composition, following curing, generates a silicone rubber to which a coating can be easily applied, and in which that coating is not easily removed.

7 Claims, No Drawings

ROOM TEMPERATURE CURABLE ORGANOPOLYSILOXANE COMPOSITION

BACKGROUND OF THE INVENTION

1. Field of the Invention

The present invention relates to a room temperature curable organopolysiloxane composition, and more specifically to a room temperature curable organopolysiloxane in which a coating can be easily applied to the surface of the silicon rubber generated following room temperature curing.

2. Description of the Prior Art

A wide variety of room temperature curable organopolysiloxane compositions, which generate rubber-like elastic bodies at room temperature through contact with moisture in the air, are already known. For example, compositions which undergo a hydrolysis reaction in the presence of moisture in the air, and cure by discharging an alcohol, offer the advantages of generating no unpleasant odors, and displaying no corrosion of metals, and are consequently used as sealing materials and adhesives for construction purposes. Furthermore, compositions which undergo curing in a similar manner but which discharge an oxime are used in a wide variety of fields including the construction field as they offer excellent storage stability and minimal unpleasant odors.

However, one drawback of these conventional room temperature curable organopolysiloxane compositions is the fact that the application of a coating to the cured silicone rubber surface is problematic. As a result of this drawback, the potential applications of these compositions are limited, despite their excellent characteristics.

In order to improve the coatability of these silicone rubber surfaces, room temperature curable organopolysiloxane compositions comprising an alcohol compound containing a monovalent organic group with a carbon-carbon triple bond and an ether linkage, or an amide group or amino group (patent reference 1), and room temperature curable organopolysiloxane compositions comprising either an amino group-containing dialkoxysilane or a partial hydrolysis-condensation product thereof (patent reference 2) have been proposed. However, although these types of compositions comprising a specific additive enable some improvement in the coatability, the adhesion between the generated coating and the silicone rubber surface is unsatisfactory, meaning peeling of the coating remains a problem.

Furthermore, in order to improve the adhesion between the cured product and the coating, room temperature curable organopolysiloxane compositions that use an amide group-containing organopolysiloxane as the primary component (patent reference 3), and room temperature curable organopolysiloxane compositions that use a secondary aminofinctional organopolysiloxane as the primary component (patent reference 4, patent reference 5) have also been proposed, but in those cases where this type of comparatively specialized material is used as the primary component, the associated costs are much higher than for a normal composition that uses, for example, a polydimethylsiloxane with hydroxyl group terminals.

Patent Reference 1: U.S. Pat. No. 4,447,576
Patent Reference 2: JP60-158254A
Patent Reference 3: JP6-220325A
Patent Reference 4: JP6-220328A
Patent Reference 5: JP6-220329A

SUMMARY OF THE INVENTION

An object of the present invention is to provide a room temperature curable organopolysiloxane which, following curing, generates a silicone rubber to which a coating can be easily applied, and in which that coating is not easily removed.

[Means for Solution of the Problems]

In order to achieve the above object, a first aspect of the present invention provides a room temperature curable organopolysiloxane composition (hereafter also referred to as a "first composition of the present invention") comprising:

(A) 100 parts by weight of a diorganopolysiloxane represented by a general formula (1) shown below:

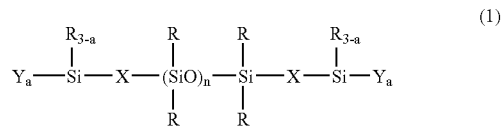

(wherein, each R represents, independently, an unsubstituted or substituted monovalent hydrocarbon group, each X represents, independently, either an oxygen atom or a bivalent hydrocarbon group of 1 to 8 carbon atoms, each Y represents, independently, a hydroxyl group or a hydrolysable group, each a represents, independently, an integer from 1 to 3, and n represents a number which results in a viscosity at 25° C. for the diorganopolysiloxane within a range from 100 to 1,000,000 mm$^2$/s), (B1) 0.1 to 20 parts by weight of at least one amine compound selected from the group consisting of amine compounds represented by a general formula (2) shown below:

(wherein, R$^1$ represents a monovalent hydrocarbon group of 12 to 30 carbon atoms), and amine compounds represented by a general formula (3) shown below:

(wherein, R$^2$ represents a bivalent hydrocarbon group of 4 to 30 carbon atoms), (C) an effective quantity of a cross-linking agent, and (D) an effective quantity of aqueous curing catalyst.

Furthermore, a second aspect of the present invention provides a room temperature curable organopolysiloxane composition (hereafter also referred to as a "second composition of the present invention"), which instead of the aforementioned component (B1) comprising at least one amine compound selected from the group consisting of amine compounds represented by the above general formula (2) and amine compounds represented by the above general formula (3), comprises:

(B2) a compound which, via a hydrolysis reaction, yields:

(B1) at least one amine compound selected from the group consisting of amine compounds represented by a general formula (2) shown below:

(wherein, $R^1$ is as defined above in relation to the general formula (2)), and amine compounds represented by a general formula (3) shown below:

$$H_2N—R^2—NH_2 \quad (3)$$

(wherein, $R^2$ is as defined above in relation to the general formula (3)), and the quantity of this compound (B2) is sufficient to generate, on hydrolysis, from 0.1 to 20 parts by weight of the above component (B1).

(Hereafter, in those cases where there is no need to differentiate between the compositions of the above two aspects of the present invention, the term "composition of the present invention" is used.)

The present invention displays superior actions and effects, in that a variety of coatings can be easily applied to the surface of a silicone rubber obtained from a room temperature curable organopolysiloxane composition of the present invention, and the adhesion of the formed coating to the silicone rubber surface is good, meaning the coating does not peel even after extended periods.

DETAILED DESCRIPTION OF THE PREFERRED EMBODIMENTS

[Component (A)]

A diorganopolysiloxane represented by a general formula (1) shown below:

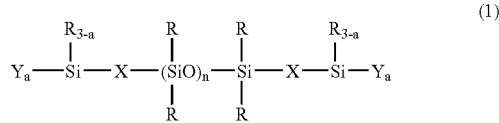

(wherein, each R represents, independently, an unsubstituted or substituted monovalent hydrocarbon group, preferably of 1 to 12, and even more preferably from 1 to 10, carbon atoms, each X represents, independently, either an oxygen atom or a bivalent hydrocarbon group of 1 to 8, and preferably from 1 to 3, carbon atoms, each Y represents, independently, a hydroxyl group or a hydrolysable group, each a represents, independently, an integer from 1 to 3, and n represents a number which results in a viscosity at 25° C. for this diorganopolysiloxane within a range from 100 to 1,000,000 mm$^2$/s, and preferably from 500 to 500,000 mm$^2$/s), which represents the component (A) of a composition of the present invention, is the primary component (base polymer) of the present invention.

Suitable examples of the groups R in the above formula include alkyl groups such as methyl groups, ethyl groups, propyl groups, butyl groups, 2-ethylbutyl groups and octyl groups; cycloalkyl groups such as cyclohexyl groups and cyclopentyl groups; alkenyl groups such as vinyl groups, hexenyl groups and allyl groups; aryl groups such as phenyl groups, tolyl groups, xylyl groups, naphthyl groups and 4-phenylphenyl groups; aralkyl groups such as benzyl groups, 2-phenylethyl groups and 2-phenylpropyl groups; and groups in which either a portion of, or all of, the hydrogen atoms bonded to carbon atoms within an aforementioned group have either been substituted with halogen atoms, cyano groups, amino groups or carboxyl groups (—COOH), or have been substituted with groups containing ether linkages (—O—), carbonyl groups (—CO—), carbonyloxy groups (—(CO)O—), oxycarbonyl groups (—O(CO)—) or —SO$_2$— linkages, such as chloromethyl groups, 3,3,3-trifluoropropyl groups, 2-cyanoethyl groups and 3-cyanopropyl groups. Of these groups, from the viewpoints of ease of synthesis and cost, methyl groups, vinyl groups and phenyl groups are preferred. Compounds in which methyl groups account for at least 90 mol % of all the groups R are particularly preferred.

The groups X represent either an oxygen atom or a bivalent hydrocarbon group, and examples of suitable bivalent hydrocarbon group include ethylene groups and trimethylene groups. Of these, from the viewpoints of curability and availability, oxygen atoms and ethylene groups are preferred.

The groups Y represent either a hydroxyl group or a hydrolysable group, and examples of suitable hydrolysable groups include alkoxy groups such as methoxy groups, ethoxy groups and butoxy groups; alkenyloxy groups such as isopropenyloxy groups and isobutenyloxy groups; ketoxime groups such as dimethyl ketoxime groups and methyl ethyl ketoxime groups; acyloxy groups such as acetoxy groups; amino groups such as N-butylamino groups and N,N-diethylamino groups; and amide groups such as N-methylacetamide groups. Of these groups, hydroxyl groups, methoxy groups and ethoxy groups are preferred.

In those cases where Y represents a hydroxyl group, a is preferably 1. Furthermore, in those cases where Y does not represent a hydroxyl group, a is preferably either 2 or 3.

Specific examples of this component (A) include polydimethylsiloxane in which both molecular chain terminals are terminated with silanol groups, dimethylsiloxane-methylphenylsiloxane copolymers in which both molecular chain terminals are terminated with silanol groups, polydimethylsiloxane in which both molecular chain terminals are terminated with trimethoxysiloxy groups, dimethylsiloxane-methylphenylsiloxane copolymers in which both molecular chain terminals are terminated with trimethoxysiloxy groups, polydimethylsiloxane in which both molecular chain terminals are terminated with methyldimethoxysiloxy groups, and polydimethylsiloxane in which both molecular chain terminals are terminated with triethoxysiloxy groups. Of these, from the viewpoint of obtaining a silicone rubber with excellent physical properties such as mechanical strength, and also in terms of cost, polydimethylsiloxane in which both molecular chain terminals are terminated with silanol groups (a=1) is preferred.

This diorganopolysiloxane of the component (A), containing hydroxyl groups or hydrolysable groups, can use either a single material or a combination of two or more different materials.

[(B1) Amine Compound]

The component (B1) used in a first composition of the present invention, namely, at least one amine compound selected from the group consisting of amine compounds represented by a general formula (2) shown below:

$$R^1NH_2 \quad (2)$$

(wherein, $R^1$ represents a monovalent hydrocarbon group of 12 to 30, and preferably from 12 to 20, and most preferably from 14 to 18, carbon atoms), and amine compounds represented by a general formula (3) shown below:

$$H_2N—R^2—NH_2 \quad (3)$$

(wherein, $R^2$ represents a bivalent hydrocarbon group of 4 to 30, and preferably from 4 to 20, and most preferably from 4 to 12, carbon atoms), is a characteristic component of the first composition of the present invention.

Incorporating this component enables certain functions to be imparted to silicone rubber, including the ability to easily apply a variety of different coatings to the surface of a silicone rubber obtained from a first composition of the present invention, and the ability to produce favorable adhesion of the thus formed coating to the silicone rubber surface, meaning the coating does not peel even after extended periods.

This component (B1) typically has a melting point from 20 to 200° C., and preferably from 25 to 140° C. If this melting point is too low, then this component becomes prone to bleed-out from the surface of the sealing material cured product or the like, meaning achieving satisfactory coatability is difficult. In contrast, if the melting point is too high, achieving a uniform mixture with the component (A) becomes difficult, and the mixing process requires an operation such as high temperature melting, or dissolution using a large volume of organic solvent, which is undesirable both in terms of processing and the physical properties of the product silicone rubber.

Suitable examples of the group $R^1$ in the above formula include an alkyl group such as a dodecyl group, tridecyl group, tetradecyl group, pentadecyl group, hexadecyl group, heptadecyl group, octadecyl group, or nonadecyl group.

Similarly, suitable examples of the group $R^2$ include an alkylene group such as a tetramethylene group, pentamethylene group, hexamethylene group, heptamethylene group, octamethylene group, nonamethylene group, decamethylene group, undecamethylene group, dodecamethylene group, tridecamethylene group, tetradecamethylene group, pentadecamethylene group, hexadecamethylene group, heptadecamethylene group, or octadecamethylene group; or an arylene group such as an o-, m- or p-phenylene group.

There are no particular restrictions on the specific structure of the amine compound of this component (B1), although 1-aminododecane (dodecylamine, melting point=28° C.), 1-aminooctadecane (octadecylamine, melting point=55 to 57° C.), 1,6-diaminohexane (hexamethylenediamine, melting point=42° C.), 1,4-diaminobutane (melting point=27 to 28° C.), 1,12-diaminododecane (melting point=69 to 71° C.), and m-phenylenediamine (melting point=63° C.) are ideal.

This component (B1) can use either a single compound or a combination of two or more different compounds.

The quantity of this component added to a first composition of the present invention is typically within a range from 0.1 to 20 parts by weight (hereafter, abbreviated as simply "parts"), and preferably from 1 to 10 parts, per 100 parts of the aforementioned component (A). If the quantity is less than 0.1 parts, then both the coatability of coatings onto the product silicone rubber surface, and the adhesion of such coatings, may be unsatisfactory, whereas in contrast, if the quantity exceeds 20 parts, then no further improvement can be expected in the effects provided by this component, and there is also a danger of impairing certain physical properties of the silicone rubber such as the mechanical strength.

[(B2) Hydrolysable Compound]

Instead of the aforementioned component (B1), a compound (B2) which, via a hydrolysis reaction, yields:

(B1) at least one amine compound selected from the group consisting of amine compounds represented by the general formula (2) shown below:

$$R^1NH_2 \qquad (2)$$

(wherein, $R^1$ is as defined above in relation to the general formula (2)), and amine compounds represented by the general formula (3) shown below:

(wherein, $R^2$ is as defined above in relation to the general formula (3)), can be added in a similar manner to the aforementioned component (B1).

Examples of this component (B2) include condensation reaction products of an aforementioned component (B1) and a ketone compound, and condensation reaction products of an aforementioned component (B1) and a silylation agent.

Using this component (B2) offers certain advantages over the use of the aforementioned component (B1), including more favorable co-solubility with the component (A), ensuring better uniform dispersibility, and simpler preparation of a second composition of the present invention, providing better process workability. Furthermore, because this component (B2) essentially corresponds with a compound in which the amino groups (—$NH_2$) of the component (B1) have been blocked, the component (B2) provides an improved level of storage stability for the second composition of the present invention, when compared with compositions containing the component (B1).

In the case of a second composition of the present invention, containing a component (B2), during the process in which the hydroxyl groups and/or hydrolysable groups within the component (A), together with the hydrolysable groups within the cross-linking agent described below, undergo hydrolysis and condensation under the action of the moisture in the air, thus forming a silicone rubber cured product, the component (B2) also undergoes hydrolysis, thus generating an amine compound of the component (B1), and as a result, the same actions and effects are achieved as those described above for the first composition of the present invention containing the component (B1).

(a) In those cases where the component (B2) is a condensation reaction product of a component (B1) and a ketone compound, the ketone compound is represented by a general formula (4) shown below:

(wherein, $R^3$ and $R^4$ are either identical or different monovalent hydrocarbon groups of 1 to 6, and preferably from 1 to 4, carbon atoms, or alternatively, $R^3$ and $R^4$ are linked together to form a divalent hydrocarbon group of 3 to 7, and preferably from 4 to 6, carbon atoms, thereby forming a hydrocarbon ring of 4 to 8, preferably 5 to 7, carbon atoms including the carbon atom of the carbonyl group (C=O)).

The groups $R^3$ and $R^4$ within the above general formula (4) may be either the same or different, and suitable examples include alkyl groups such as methyl groups, ethyl groups, propyl groups, isopropyl groups, butyl groups, isobutyl groups, pentyl groups and isopentyl groups; and aralkyl groups such as benzyl groups and 2-phenylethyl groups. Examples of the hydrocarbon ring formed by linking the groups $R^3$ and $R^4$ include a cyclopentane ring, cyclohexane ring and cycloheptane ring.

Specific examples of suitable ketone compounds include acetone, methyl ethyl ketone, methyl isobutyl ketone, cyclohexanone and cyclopentanone. Of these, methyl isobutyl ketone is particularly preferred. The ketone compound can use either a single compound or a combination of two or more different compounds.

The quantity of the ketone compound used in the reaction with the amine compound of the component (B1) is typically within a range from 1 to 100 mols, and preferably from 1.1 to 20 mols, per 1 mol of amino groups (—NH$^2$) within the component (B1).

The reaction that generates the condensation reaction product is the dehydration condensation reaction outlined by the equation below, wherein the component (B1) is expressed as "(B1)—NH$_2$".

(B1)—NH$_2$+O═C→(B1)—N═C═+H$_2$O

When this type of condensation reaction product of a component (B1) and a ketone is added, as described above, during the process for forming the silicone rubber, the condensation reaction product undergoes hydrolysis, forming an aforementioned component (B1) and a by-product ketone compound, and even if this ketone compound becomes incorporated within the silicone rubber, it volatilizes and is removed over time, meaning it has no impact on the physical properties of the product silicone rubber. (b) In those cases where the component (B2) is a condensation reaction product of a component (B1) and a silylation agent, the silylation agent can use a chlorosilane compound represented by a general formula (5) shown below:

R$^5_b$R$^6_c$Si$_{(4-b-c)}$Cl                    (5)

(wherein, R$^5$ and R$^6$ are either identical or different monovalent hydrocarbon groups of 1 to 10, and preferably from 1 to 6, carbon atoms, b and c each represent an integer from 0 to 3, and the sum of b+c is 3).

The groups R$^5$ and R$^6$ within the above general formula (5) may be either the same or different, and suitable examples include alkyl groups such as methyl groups, ethyl groups, propyl groups, isopropyl groups and butyl groups; alkenyl groups such as vinyl groups and allyl groups; and aryl groups such as phenyl groups.

Specific examples of preferred forms of this chlorosilane compound include trimethylchlorosilane, dimethylphenylchlorosilane, diphenylmethylchlorosilane, and dimethylvinylchlorosilane. This chlorosilane compound can use either a single compound or a combination of two or more different compounds.

The quantity of the chlorosilane compound used in the reaction with the amine compound of the component (B1) is typically within a range from 1 to 2 mols, and preferably from 1 to 1.2 mols, per 1 mol of amino groups (—NH$_2$) within the component (B1).

The reaction that generates the condensation reaction product is the dehydrochlorination condensation reaction outlined by the equation below, wherein the component (B1) is expressed as "(B1)—NH$_2$".

(B1)—NH$_2$+ClSi≡→(B1)—NH—Si≡+HCl

In addition to the chlorosilane compounds described above, N,O-bis(trimethylsilyl)acetamides can also be used as the silylation agent. In such cases, the silylation agent is reacted with the amide compound of the component (B1) and generates, essentially, a condensation reaction product with a structure represented by a formula (B1)—NH—Si (CH$_3$)$_3$, and can be used in the same manner as the aforementioned chlorosilane compounds.

Furthermore, in those cases where a condensation reaction product of the component (B1) and a silylation agent are added, then as described above, during the process for forming the silicone rubber, the condensation reaction product undergoes hydrolysis, forming the aforementioned component (B1) and a by-product silane compound containing a silanol group (SiOH), and because this silane compound is a condensation reactive component, it is incorporated within the silicone rubber, and causes no particular problems.

This component (B2) can use either a single compound or a combination of two or more different compounds.

Furthermore, the quantity of the component (B2) added to a second composition of the present invention is sufficient to generate, on hydrolysis, from 0.1 to 20 parts, and preferably from 1 to 10 parts, of the amine compound of the component (B1), per 100 parts of the aforementioned component (A). If the quantity of this amine compound generated is less than 0.1 parts, then both the coatability of coatings onto the product silicone rubber surface, and the adhesion of such coatings, may be unsatisfactory, whereas in contrast, if the quantity exceeds 20 parts, then no further improvement can be expected in the effects provided by this component, and because there is a resulting increase in the quantity of either the by-product ketone compound, or structures derived from the monofunctional silane compound containing a silanol group, there is also a danger of impairing certain physical properties of the silicone rubber such as the mechanical strength.

[Cross-Linking Agent]

Any of the cross-linking agents typically added to conventional room temperature curable organopolysiloxane compositions can be used in a composition of the present invention. Suitable examples include silane or siloxane compounds containing at least 2 hydrolysable groups within each molecule.

Specific examples of these hydrolysable groups include alkoxy groups such as methoxy groups, ethoxy groups and butoxy groups; alkenoxy groups such as isopropenoxy groups and isobutenoxy groups; ketoxime groups such as dimethyl ketoxime groups and methyl ethyl ketoxime groups; acyloxy groups such as acetoxy groups; amino groups such as N-butylamino groups and N,N-diethylamino groups; and amide groups such as N-methylacetamide groups.

Specific examples of the cross-linking agent include methyltrimethoxysilane, vinyltrimethoxysilane, propyltrimethoxysilane, decyltrimethoxysilane, phenyltrimethoxysilane, methyltriethoxysilane, vinyltriethoxysilane, propyltriethoxysilane, decyltriethoxysilane, phenyltriethoxysilane, methyltri(isopropenoxy)silane, ethyltri(isopropenoxy)silane, propyltri(isopropenoxy)silane, vinyltri(isopropenoxy)silane, methyltris(methylethylketoxime)silane, ethyltris(methylethylketoxime)silane, vinyltris(methylethylketoxime)silane, phenyltris(methylethylketoxime)silane, methyltriacetoxysilane, ethyltriacetoxysilane and methyltris(N-butylamino)silane. The cross-linking agent can use either a single compound or a combination of two or more different compounds.

There are no particular restrictions on the quantity of the cross-linking agent added to a composition of the present invention, provided the quantity is effective in manifesting a hydrolysis-condensation reaction with the hydroxyl groups or hydrolysable groups within the component (A) to generate a silicone rubber with excellent physical properties such as mechanical strength, although the quantity is typically within a range from 1 to 50 parts, and preferably from 2 to 20 parts, per 100 parts of the component (A). If this quantity is too large, then the curing of deep sections slows considerably, and the mechanical strength of the product silicone rubber may deteriorate.

[Curing Catalyst]

Examples of the curing catalyst include alkyltin carboxylate compounds such as dibutyltin diacetate, dibutyltin dilaurate and dibutyltin dioctoate; titanate esters and titanium chelate compounds such as tetraisopropoxytitanium, tetra-n-butoxytitanium, tetrakis(2-ethylhexoxy)titanium, dipropoxybis(acetylacetonato)titanium and titanium isopropoxyoctylene glycol; metal-containing organic compounds such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; aminoalkyl group substituted alkoxysilanes such as γ-aminopropyltriethoxysilane and N-(β-aminoethyl)-γ-aminopropyltrimethoxysilane; quaternary ammonium salts such as benzyltriethylammonium acetate; alkali metal lower fatty acid salts such as potassium acetate, sodium acetate and lithium oxalate; dialkylhydroxylamines such as dimethylhydroxylamine and diethylhydroxylamine; and silanes or siloxanes containing a gianidyl group, such as tetramethylguanidylpropyltrimethoxysilane, tetramethylguanidylpropylmethyldimethoxysilane and tetramethylguanidylpropyltris(trimethylsiloxy)silane.

This curing catalyst can use either a single material or a combination of two or more different materials. Furthermore, there are no particular restrictions on the quantity of the catalyst added to a composition of the present invention, and an effective catalytic quantity is adequate, although typically, quantities from 0 to 10 parts, and preferably from 0.01 to 5 parts, per 100 parts of the component (A) are suitable.

[Other Components]

In addition to the components (A1), the component (B1) or (B2), the cross-linking agent, and the curing catalyst described above, other optional components typically added to conventional room temperature curable organopolysiloxane compositions may be added to a composition of the present invention, provided such addition does not impair the effects of the present invention, in particular the ability of the present invention to produce a silicone rubber with favorable flexibility, good workability including coatability to the surface of the silicone rubber, and good adhesion of such coatings.

For example, silicone oils such as dimethylpolysiloxanes containing no functional groups and with both terminals blocked with trimethylsilyl groups can be added for purposes such as altering the viscosity or the thixotropicity of the composition, or modifying the hardness of the cured product. In those cases where a silicone oil is added, the viscosity of the oil at 25° C. is typically within a range from 10 to 100,000 $mm^2/s$, and preferably from 50 to 1,000 $mm^2/s$, and the quantity added is typically from 1 to 100 parts, and preferably from 2 to 20 parts, per 100 parts of the component (A).

Furthermore, examples of suitable fillers include reinforcing fillers such as fumed silica, precipitated silica, quartz powder, carbon powder, talc, zeolite and bentonite; fibrous fillers such as asbestos, glass fiber, carbon fiber and organic fibers; basic fillers such as calcium carbonate, zinc carbonate, magnesium oxide, and celite; as well as fillers in which the surface has undergone surface treatment with a silane, siloxane or resin acid. In those cases where a filler is added, the quantity is preferably within a range from 1 to 200 parts per 100 parts of the component (A).

In addition, where required, predetermined quantities of thixotropic imparting agents comprising polyethylene glycol or derivatives thereof; heat resistance improvement agents such as red iron oxide or cerium oxide; cold resistance agents; dehydrating agents; rustproofing agents; adhesion improvement agents such as γ-aminopropyltriethoxysilane and N-(β-aminoethyl)-γ-aminopropyltrimethoxysilane; and liquid reinforcing agents such as network type polysiloxanes comprising triorganosiloxy units, $SiO_2$ units and/or monoorganosiloxy units can also be added to a composition of the present invention.

EXAMPLES

As follows is a description of specifics of the present invention, based on a series of synthetic examples, examples, and comparative examples, although the present invention is in no way restricted to the examples presented below. The viscosity values reported in the examples and the comparative examples refer to values measured at 25° C. In addition, the term "parts" refers to parts by weight.

First is a description of the methods used for measuring and evaluating the various performance factors for the cured silicone rubbers obtained from the room temperature curable organopolysiloxane compositions described in each of the following examples and comparative examples.

[Coatability Test]

Each of the compositions described below was coated, in the form of a 2 mm thick sheet, onto the top of a releasable substrate, and was then cured by standing for 7 days under conditions of 23° C. and 50% RH, thus forming a rubber sheet. A single coat of a water-based acrylic resin paint (brand name: multipurpose matt Ales Arch, manufactured by Kanpe Hapio Co., Ltd.) was applied with a brush so as to cover an area of 5 cm×5 cm of the surface of the rubber sheet, and the state of the thus formed coating was inspected visually, and the coatability was evaluated in the manner described below.

In those cases where the paint was able to be applied uniformly across the entire surface area, the coatability was evaluated as good, and was recorded with the symbol O. In those cases where the paint was able to be applied uniformly to at least 90%, but less than 100%, of the surface area, but there remained some sections on the surface of the rubber sheet where the paint did not hold, the coatability was evaluated as somewhat unsatisfactory, and was recorded with the symbol Δ. In those cases where the paint was only able to be applied uniformly to less than 90% of the surface area, and there were substantial sections on the surface of the rubber sheet where the paint did not hold, the coatability was evaluated as poor, and was recorded with the symbol x.

[Coating Adhesion Test]

Following the above coatability test, the painted sheet was allowed to stand for 24 hours under conditions of 23° C. and 50% RH to ensure that the coating on the rubber sheet surface had adequately dried and cured.

Subsequently, an 18 mm wide adhesive cellophane tape was stuck to the surface of the coating, and the degree of separation of the coating when the tape was peeled off was observed visually, and the adhesion of the coating was evaluated in the manner described below.

In those cases where there was absolutely nothing adhered to the peeled cellophane tape, the adhesion of the coating to the rubber sheet was evaluated as good, and was recorded with the symbol O. In those cases where fragments of separated coating had adhered to portions of the cellophane tape, the adhesion of the coating to the rubber sheet was evaluated as somewhat unsatisfactory, and was recorded with the symbol Δ. In those cases where the coating had separated and adhered to the entire surface of the cellophane tape, the adhesion of the coating to the rubber sheet was evaluated as poor, and was recorded with the symbol x.

[Measurement of Physical Characteristics]

The physical characteristics (hardness, tensile strength, elongation) of a 2 mm thick rubber sheet identical with that prepared for the above coatability test were measured in accordance with JIS K6301. A JIS A type hardness meter was used for the hardness measurement.

Synthetic Example 1

A four neck separable flask equipped with a reflux condenser with an attached distillation tube, a stirrer, a nitrogen inlet tube and a thermometer was charged with 54 g of octadecylamine and 400 g of methyl isobutyl ketone (MIBK), and the temperature was then gradually raised while the flask was flushed with nitrogen. With the internal temperature of the flask maintained at 120° C., the reaction was allowed to proceed for approximately 5 hours, while the condensation water was removed by azeotropic dehydration. Following completion of the reaction, the low boiling point materials such as MIBK were removed, yielding a condensation reaction product (B2-1) in the form of a light brown colored, transparent liquid.

Synthetic Example 2

With the exceptions of replacing the 54 g of octadecylamine and the 400 g of MIBK with 42 g of 1,4-diaminobutane and 200 g of MIBK respectively, and altering the reaction time from approximately 5 hours to approximately 4 hours, a condensation reaction product (B2-2) was obtained in the same manner as the synthetic example 1.

Synthetic Example 3

With the exceptions of replacing the 54 g of octadecylamine and the 400 g of MIBK with 78 g of 1,6-diaminohexane and 200 g of MIBK respectively, a condensation reaction product (B2-3) was obtained in the same manner as the synthetic example 1.

Synthetic Example 4

With the exceptions of replacing the 54 g of octadecylamine and the 400 g of MIBK with 25 g of 1,12-diaminododecane and 300 g of MIBK respectively, and altering the reaction time from approximately 5 hours to approximately 4 hours, a condensation reaction product (B2-4) was obtained in the same manner as the synthetic example 1.

Example 1

40 parts of a dimethylpolysiloxane with both molecular chain terminals terminated with silanol groups and with a viscosity at 25° C. of 50,000 mm$^2$/s, 20 parts of a dimethylpolysiloxane with both terminals blocked with trimethylsilyl groups and with a viscosity at 25° C. of 100 mm$^2$/s, 40 parts of colloidal calcium carbonate (average particle size 0.07 μm) that had been surface treated with resin acid (brand name: MT-100, manufactured by Maruo Calcium Co., Ltd.), and 1 part of octadecylamine were combined, and then kneaded using a three roll mill to generate a uniform mixture. Subsequently, 4 parts of methyltris(methylethylketoxime)silane, 2 parts of vinyltris(methylethylketoxime)silane, 0.2 parts of a 50% by weight toluene solution of dibutyltin dioctoate, and 1 part of γ-aminopropyltriethoxysilane were added, and then mixed under substantially anhydrous conditions to prepare a room temperature curable organopolysiloxane composition. This composition was evaluated by performing a coatability test and a coating adhesion test, and by measuring the physical characteristics, in accordance with the methods described above. The results are shown in Table 1.

Example 2

With the exceptions of not using the 1 part of octadecylamine stated in the example 1, and moreover, adding an additional 1 part of the condensation reaction product (B2-1) to 100 parts of the prepared composition, and then mixing under substantially anhydrous conditions, a room temperature curable organopolysiloxane composition was prepared and evaluated in the same manner as the example 1. The results are shown in Table 1.

Example 3

With the exceptions of not using the 1 part of octadecylamine stated in the example 1, and moreover, adding an additional 1 part of the condensation reaction. product (B2-2) to 100 parts of the prepared composition, and then mixing under substantially anhydrous conditions, a room temperature curable organopolysiloxane composition was prepared and evaluated in the same manner as the example 1. The results are shown in Table 1.

Example 4

With the exceptions of not using the 1 part of octadecylamine stated in the example 1, and moreover, adding an additional 1 part of the condensation reaction product (B2-3) to 100 parts of the prepared composition, and then mixing under substantially anhydrous conditions, a room temperature curable organopolysiloxane composition was prepared and evaluated in the same manner as the example 1. The results are shown in Table 1.

Example 5

60 parts of a dimethylpolysiloxane with both molecular chain terminals terminated with silanol groups and with a viscosity at 25° C. of 50,000 mm$^2$/s, 20 parts of a dimethylpolysiloxane with both terminals blocked with trimethylsilyl groups and with a viscosity at 25° C. of 100 mm$^2$/s, and 10 parts of fumed silica that had been surface treated with dimethyldichlorosilane were combined, and then kneaded using a three roll mill to generate a uniform mixture. Subsequently, 4 parts of methyltris(methylethylketoxime)silane, 2 parts of vinyltris(methylethylketoxime)silane, 0.2 parts of a 50% by weight toluene solution of dibutyltin dioctoate, and 1 part of N-(β-aminoethyl)-γ-aminopropyltrimethoxysilane were added, and then mixed under substantially anhydrous conditions, yielding a uniform mixture.

To 100 parts of this mixture was added 1 part of octadecylamine, and mixing was then performed under substantially anhydrous conditions at a temperature of 60° C. to prepare a room temperature curable organopolysiloxane composition. This composition was evaluated by performing a coatability test and a coating adhesion test, and by measuring the physical characteristics, in accordance with the methods described above. The results are shown in Table 1.

Example 6

With the exception of replacing the 1 part of octadecylamine with 1 part of the condensation reaction product (B2-1), a room temperature curable organopolysiloxane composition was prepared and evaluated in the same manner as the example 5. The results are shown in Table 1.

Example 7

With the exception of replacing the 1 part of octadecylamine with 1 part of the condensation reaction product (B2-2), a room temperature curable organopolysiloxane composition was prepared and evaluated in the same manner as the example 5. The results are shown in Table 1.

Example 8

With the exception of replacing the 1 part of octadecylamine with 1 part of the condensation reaction product (B2-3), a room temperature curable organopolysiloxane composition was prepared and evaluated in the same manner as the example 5. The results are shown in Table 1.

Example 9

60 parts of a dimethylpolysiloxane with both molecular chain terminals terminated with silanol groups and with a viscosity at 25° C. of 100,000 mm²/s, and 40 parts of colloidal calcium carbonate (average particle size 0.07 μm) that had been surface treated with resin acid (brand name: MT-100, manufactured by Maruo Calcium Co., Ltd.) were combined, and then kneaded using a three roll mill to generate a uniform mixture. Subsequently, 4 parts of methyltris(methylethylketoxime)silane, 2 parts of vinyltris(methylethylketoxime)silane, 0.2 parts of dibutyltin dioctoate, 1 part of γ-aminopropyltriethoxysilane, and 1 part of the condensation reaction product (B2-4) were added, and then mixed under substantially anhydrous conditions to prepare a room temperature curable organopolysiloxane composition. This composition was evaluated by performing a coatability test and a coating adhesion test, and by measuring the physical characteristics, in accordance with the methods described above. The results are shown in Table 1.

Comparative Example 1

With the exception of not using the 1 part of octadecylamine stated in the example 1, a room temperature curable organopolysiloxane composition was prepared and evaluated in the same manner as the example 1. The results are shown in Table 2.

Comparative Example 2

The 1 part of octadecylamine was not added to the 100 parts of the mixture described in the example 5, and the mixing operation under substantially anhydrous conditions at a temperature of 60° C. was not performed, and instead, the mixture was evaluated by performing a coatability test and a coating adhesion test, and by measuring the physical characteristics, in accordance with the methods described above. The results are shown in Table 2.

Comparative Example 3

With the exception of replacing the 1 part of octadecylamine stated in the example 5 with 1 part of n-hexylamine (melting point=−23° C.), a room temperature curable organopolysiloxane composition was prepared and evaluated in the same manner as the example 5. The results are shown in Table 2.

Comparative Example 4

With the exception of replacing the 1 part of octadecylamine stated in the example 5 with 1 part of n-octylamine (melting point=−1° C.), a room temperature curable organopolysiloxane composition was prepared and evaluated in the same manner as the example 5. The results are shown in Table 2.

Comparative Example 5

With the exception of replacing the 1 part of octadecylamine stated in the example 5 with 1 part of di(n-octyl) amine (melting point=14 to 15° C.), a room temperature curable organopolysiloxane composition was prepared and evaluated in the same manner as the example 5. The results are shown in Table 2.

Comparative Example 6

With the exception of replacing the 1 part of octadecylamine stated in the example 5 with 1 part of caprylic acid (melting point=16° C.), a room temperature curable organopolysiloxane composition was prepared and evaluated in the same manner as the example 5. The results are shown in Table 2.

Comparative Example 7

With the exception of replacing the 1 part of octadecylamine stated in the example 5 with 1 part of lauric acid (melting point=45° C.), a room temperature curable organopolysiloxane composition was prepared and evaluated in the same manner as the example 5. The results are shown in Table 2.

TABLE 1

|  | Examples | | | | | | | | |
| --- | --- | --- | --- | --- | --- | --- | --- | --- | --- |
|  | 1 | 2 | 3 | 4 | 5 | 6 | 7 | 8 | 9 |
| Hardness (JIS-A) | 25 | 22 | 25 | 27 | 22 | 20 | 18 | 17 | 38 |
| Tensile strength (MPa) | 1.3 | 1.2 | 1.3 | 1.2 | 1.4 | 1.2 | 1.4 | 1.3 | 1.8 |
| Elongation (%) | 640 | 600 | 590 | 500 | 560 | 410 | 460 | 460 | 660 |
| Coatability | ○ | ○ | ○ | ○ | ○ | ○ | ○ | ○ | ○ |
| Coating adhesion | Δ | Δ | ○ | ○ | Δ | Δ | ○ | ○ | ○ |

TABLE 2

| | Comparative Examples | | | | | | |
|---|---|---|---|---|---|---|---|
| | 1 | 2 | 3 | 4 | 5 | 6 | 7 |
| Hardness (JIS-A) | 28 | 24 | 23 | 23 | 23 | 24 | 23 |
| Tensile strength (MPa) | 1.8 | 1.6 | 1.3 | 1.4 | 1.2 | 1.5 | 1.5 |
| Elongation (%) | 550 | 560 | 500 | 560 | 520 | 530 | 510 |
| Coatability | x | x | x | x | x | x | x |
| Coating adhesion | x | x | x | x | x | x | x |

[Evaluations]

From the results in Table 1 it is evident that the silicone rubbers obtained from the compositions of the examples 1 to 9, containing either the component (B1) or the component (B2), displayed favorable coatability and coating adhesion, whereas the silicone rubbers obtained from the compositions of the comparative examples 1 to 7, which did not contain the above components, displayed poor paint coatability, and furthermore provided absolutely no coating adhesion.

What is claimed is:

1. A room temperature curable organopolysiloxane composition comprising:
   (A) 100 parts by weight of a diorganopolysiloxane represented by a general formula (1) shown below:

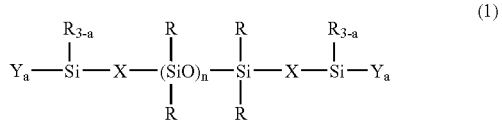
(1)

(wherein, each Y represents a hydroxyl group, and each R represents, independently, an unsubstituted or substituted monovalent hydrocarbon group, each X represents, independently, either an oxygen atom or a bivalent hydrocarbon group of 1 to 8 carbon atoms, each a represents, independently, an integer from 1 to 3, and n represents a number which results in a viscosity at 25° C. for said diorganopolysiloxane within a range from 100 to 1,000,000 mm²/s,
   (B2) a compound which, via a hydrolysis reaction, yields:
   (B1) at least one amine compound selected from the group consisting of amine compounds represented by a general formula (2) shown below:

$$R^1NH_2 \quad (2)$$

(wherein, $R^1$ represents a monovalent hydrocarbon group of 12 to 30 carbon atoms, and amine compounds represented by a general formula (3) shown below:

$$H_2N-R^2-NH_2 \quad (3)$$

(wherein, $R^2$ represents a bivalent hydrocarbon group of 4 to 30 carbon atoms), wherein a quantity of said compound (B2) is sufficient to generate, on hydrolysis, from 0.1 to 20 parts by weight of said component (B1),
   (C) an effective quantity of a cross-linking agent, and
   (D) an effective quantity of curing catalyst.

2. The composition according to claim 1, wherein said component (B2) is a condensation reaction product of said component (B1) and a ketone compound represented by a general formula (4) shown below:

$$R^3-(C=O)-R^4 \quad (4)$$

(wherein, $R^3$ and $R^4$ are either identical or different monovalent hydrocarbon groups of 1 to 6 carbon atoms, or alternatively, $R^3$ and $R^4$ are linked together to form a divalent hydrocarbon group of 3 to 7 carbon atoms).

3. The composition according to claim 1, wherein said component (B2) is a condensation reaction product of a component (B1) and a silylation agent.

4. The composition according to claim 3, wherein said silylation agent is a chlorosilane compound represented by a general formula (5):

$$R^5_b R^6_c Si_{(4-b-c)}Cl \quad (5)$$

(wherein, $R^5$ and $R^6$ are either identical or different monovalent hydrocarbon groups of 1 to 10 carbon atoms, b and c each represent an integer from 0 to 3, and the sum of b+c is 3).

5. The composition according to claim 3, wherein said silylation agent is N,O-bis(trimethylsilyl)acetamide.

6. The composition according to claim 1, wherein said component (B1) is an amine compound with a melting point of 20 to 200° C.

7. The composition according to claim 1, wherein said cross-linking agent is a silane or siloxane compound containing at least 2 hydrolysable groups within each molecule.

* * * * *